US009772947B2

(12) United States Patent
Amrhein et al.

(10) Patent No.: US 9,772,947 B2
(45) Date of Patent: Sep. 26, 2017

(54) CLIENT VOTING-INCLUSIVE IN-MEMORY DATA GRID (IMDG) CACHE MANAGEMENT

(71) Applicant: International Business Machines Corporation, Armonk, NY (US)

(72) Inventors: Dustin K. Amrhein, Zachary, LA (US); Kulvir S. Bhogal, Fort Worth, TX (US); Nitin Gaur, Round Rock, TX (US); Christopher D. Johnson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 14/754,028

(22) Filed: Jun. 29, 2015

(65) Prior Publication Data

US 2016/0378666 A1 Dec. 29, 2016

(51) Int. Cl.
| | |
|---|---|
| G06F 15/167 | (2006.01) |
| G06F 12/0855 | (2016.01) |
| G06F 3/06 | (2006.01) |
| H04L 29/08 | (2006.01) |
| G06F 9/455 | (2006.01) |

(52) U.S. Cl.
CPC .......... *G06F 12/0857* (2013.01); *G06F 3/067* (2013.01); *G06F 3/0613* (2013.01); *G06F 3/0656* (2013.01); *G06F 9/45558* (2013.01); *H04L 67/1097* (2013.01); *H04L 67/2842* (2013.01); *G06F 2009/45583* (2013.01); *G06F 2212/1021* (2013.01); *G06F 2212/151* (2013.01); *G06F 2212/163* (2013.01); *G06F 2212/254* (2013.01); *G06F 2212/264* (2013.01)

(58) Field of Classification Search
USPC ........................................................ 709/213
See application file for complete search history.

(56) References Cited

U.S. PATENT DOCUMENTS

| | | | |
|---|---|---|---|
| 8,606,996 B2 | 12/2013 | Richardson et al. | |
| 2014/0052918 A1 | 2/2014 | Khailany et al. | |
| 2014/0359049 A1 * | 12/2014 | Petersen | ............. H04L 67/1095 709/213 |

OTHER PUBLICATIONS

Marissa Coren, et al., The @WalmartLabs Blog—Category: Optimization, blog/website, Jul. 24-Oct. 31, 2013, pp. 1-10, Walmart Stores Inc., Published online at: http://www.walmartlabs.com/category/optimization/.

* cited by examiner

*Primary Examiner* — Hee Soo Kim
(74) *Attorney, Agent, or Firm* — Lee Law, PLLC; Christopher B. Lee (57) ABSTRACT

A client application cache access profile is created that documents accesses over time to data cached within an in-memory data grid (IMDG) cache by each of a set of client applications that utilize the IMDG. A new data request is received from one of the set of client applications that includes a client-application data caching vote that specifies whether the requesting client application wants the newly-requested data cached. In response to an IMDG cache data miss related to the new data request, a determination is made as to whether to cache the newly-requested data based upon analysis of the client application cache access profile of the client application from which the new data request was received, IMDG system performance cache costs of caching the newly-requested data, and the client-application data caching vote. The newly-requested data is cached within the IMDG cache in response to determining to cache the newly-requested data.

20 Claims, 4 Drawing Sheets

CLIENT VOTING-INCLUSIVE IN-MEMORY DATA GRID (IMDG) CACHE MANAGEMENT

BACKGROUND

The present invention relates to in-memory data grid (IMDG) cache management. More particularly, the present invention relates to client voting-inclusive in-memory data grid (IMDG) cache management.

An in-memory data grid (IMDG) is a set of interconnected Java™ virtual machine (JVM®) instances that collectively provides an address space within which to store large amounts of data in the form of Java™ objects. The JVM® instances may be co-located on the same computing device or may be distributed across multiple computing devices.

SUMMARY

A method includes creating, by a processor over time for each of a plurality of client applications that utilize an in-memory data grid (IMDG), a client application cache access profile that documents accesses to data cached within an IMDG cache by the respective client application and accesses by other of the plurality of client applications to data cached responsive to data requests issued by the respective client application; receiving, from one of the plurality of client applications, a new data request that comprises a client-application data caching vote that specifies whether the requesting client application wants data requested by the new data request cached; determining, in response to an IMDG cache data miss related to the new data request, whether to cache the newly-requested data within the IMDG cache based upon analysis of the client application cache access profile of the client application from which the new data request was received, IMDG system performance cache costs of caching the newly-requested data within the IMDG cache, and the client-application data caching vote; and caching the newly-requested data within the IMDG cache in response to determining to cache the newly-requested data based upon the analysis.

A system that performs the method and a computer program product that causes a computer to perform the method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides client voting-inclusive in-memory data grid (IMDG) cache management. The present technology solves a recognized in-memory data grid (IMDG) problem by providing technology that includes a new form of computing platform that integrates front-end client-driven voting/weighting regarding data storage and retention within IMDG caches, with client access analysis and back-end predictive analysis. The present technology improves computational processing and IMDG cache storage utilization within complex computing environments. As such, improved computational and data access speed may be obtained by use of the present technology.

The present technology operates by creating, over time for each of a set of client applications that utilize an in-memory data grid (IMDG), a client application cache access profile that documents accesses to data cached within an IMDG cache by the respective client application and accesses by other of the set of client applications to data cached responsive to data requests issued by the respective client application. A new data request is received from one of the set of client applications that includes a client-application data caching vote that specifies whether the requesting client application wants data requested by the new data request cached. A determination is made, in response to an IMDG cache data miss related to a new data request, whether to cache the newly-requested data within the IMDG cache based upon analysis of the client application cache access profile of the client application from which the new data request was received, IMDG system performance cache costs of caching the newly-requested data within the IMDG cache, and the client-application data caching vote. The newly-requested data is cached within the IMDG cache in response to determining to cache the newly-requested data based upon the analysis.

The technology described herein operates in conjunction with detection of cache data misses (e.g., a data access request where the requested data is not located within the IMDG cache). To further improve the efficiency of data caching decisions, four primary factors are considered when deciding whether to cache data that has been requested by a particular client application. First, client applications may be provided with an opportunity to vote on whether to cache the data associated with a particular data request, which represents a weighted client data request. Second, the cost of caching the data associated with a particular data request may be determined, which includes determining the data fetching time, the data size, and the impact of storing the requested data on the cache (e.g., capacity, etc.). Third, client-application specific heuristics (e.g., past statistical data and profiling of individual clients and types of data accesses) may be integrated into the decision process.

Fourth, time or cost based upon bypassing the cache and retrieving the data from long-term storage if requested again may be determined. These various factors form a complex and comprehensive front-end to back-end iterative correlated feedback loop for evaluation of cache utilization efficiency and for future decisions regarding data caching priorities.

To following several details provide a foundational understanding for the description that follows. A new cache management service/technology is provided in association with an IMDG (alternatively termed "grid" herein). The cache management service provides certain core functionality that allows applications to interact with JVM® instances within the grid to request and influence caching of the data. For example, the cache management service provides cache management, data optimization, and performs processing related to an elastic nature of the grid (e.g., discovery and recovery with respect to grid data placements). In addition to storing data, each grid JVM® instance (alternatively termed a grid "member" or an "agent") is capable of executing business logic that provides information usable by the cache management service. The agents may perform different a functionality within the grid, such as providing a mechanism to do map-reduce type work, and providing information to the cache management service. The information provided to the cache management service may include client access information gathered over time and client weighting/voting regarding cache storage of data associated with individual data accesses. This front-end client-centric information (i.e., analytics and weighting), along with back-end performance and other metrics, may be used by the cache management service to make informed decisions regarding caching of data within the grid. The cache management service may thereby perform intelligent actions on the IMDG cache based on the information provided by the agents and the clients.

The remainder of the description herein primarily utilizes the term "virtual machine" to illustrate that the description herein is not limited to a particular form of virtual machine, such as a JVM® instance. As such, any form of virtual machine may be utilized to implement the respective portion(s) of the technology described herein as appropriate for a given implementation.

Client applications access the data in the grid by obtaining maps of data distribution across the virtual machine instances within the grid, and by subsequently performing grid operations (e.g., data puts, data gets, etc.) in accordance with the information in the maps. Client application accesses are monitored over time by agents to collect information on the client application data accesses (e.g., data access patterns), and to provide this information routinely (e.g., periodically, aperiodically, etc.) to the cache management service. The periodicity at which the agents provide the information on client data accesses may be configured as appropriate for a given implementation. This processing may be driven through a persistent mechanism, such as a flat file/database or other form of in-memory data structure.

The cache management service may determine a weight for caching data associated with any particular data request based upon a collection of factors related to the requesting client application in conjunction with factors related to the requested data. For example, the weighting may be based upon system performance cache costs of caching the data compared with reacquiring the data from back-end storage if not cached (e.g., fetching time, serialization, performance impact, client side virtual machine processing, etc.), client application heuristics (e.g., frequency of data access, type of data access, etc.), and data request popularity versus anomaly determinations (e.g., whether the data access is likely usable by many client applications or is a "one-time" access, etc.).

The cache management service further augments the weighting to cache the data in accordance with a client application vote or client-applied weighting associated with the request (e.g., a caching suggestion from the client application point of view). As such, the technology described herein provides enhanced cache management within an IMDG that is client aware. Client-application inputs to cache data and client application data accesses are monitored over time to further weight the client application votes. The cache management service updates the applied weighting responsive to a client application-specific determination based upon the client application vote/weighting, and a client-based analytic score is attached to the data in a map in accordance with configured cache policies (e.g., cache lifecycle, time to live (TTL), etc.).

Cache updates are managed according to the attached client-based analytic score associated with a new data request. As such, the analytics applied by the cache management service for IMDG cache management combine server-side analytics-driven cache management with client-aware ("client-centric") data cache management and cache data retention policies.

Client-centric statistical analysis is utilized in association with cache misses within an IMDG to determine whether data that a particular client is requesting is statistically likely to be requested again (e.g., by the same client or by a different client). If it is determined that the data a particular client is requesting is statistically likely to be requested again, the requested data may be populated within the IMDG cache. If it is determined that the data a particular client is requesting is not statistically likely to be requested again, the particular client's request may be considered a "one-off" request and the data may not be populated within the IMDG cache.

The statistical likelihood of reuse of data associated with a client data access request may be evaluated by profiling/categorizing client application data accesses over time within an IMDG. For example, if a particular client application routinely requests data that is determined to be reused by the same client application and/or used by other client applications (e.g., "popular" data requests), that client application may be profiled as issuing requests that have high relevance and statistical likelihood of reuse by the same client and/or other clients. In contrast, if a particular client application routinely requests data that is determined not to be reused by the same client application and/or not used by other client applications (e.g., a client that routinely issues one-off requests), that client application may be profiled as issuing requests that lack relevance and statistical likelihood of reuse by the same client application and/or other client applications.

The statistical likelihood of data reuse may be considered a correlation between the client data access patterns and reuse potential for data requested by the different client applications. Correlation of these client data access patterns with the likelihood of data reuse may be utilized to selectively determine what data to populate within an IMDG cache, and what data to retrieve from bulk storage without being populated into the IMDG cache. As such, cache storage space utilization efficiency may be improved by the evaluation of client application data access characteristics as described herein.

To further the examples from above, when a request to access data is received, the technology described herein may operate to identify anomalies and/or inconsistencies among the various factors used to decide to cache the requested data, and may include or exclude caching of the requested data to maximize overall efficiency of performance and storage across the grid. As described above, client applications are given a vote regarding whether to cache the data. For example, where the data being requested is expensive to retain in cache (e.g., due to size, etc.) and there is a low likelihood of the data being used again (e.g., heuristics show an extended time interval to likely reuse, knowledge of no planned reuse, and other factors), the cache management service my opt to selectively exclude the data from caching irrespective of the client application's vote to retain the data in cache. Alternatively, as an additional efficiency measure, where the data is inexpensive to retain in cache (e.g., again due to size, etc.) and there is a high likelihood of the data being used again, the cache management service may opt to cache the data irrespective of the client application's vote not to retain the data in cache. This processing may be scoped by system, application, user, or session.

The cache management service may choose to cache or not to cache data based on the weight on the request provided by the client application from the client point-of-view, such as how much benefit the client application believes may be obtained from caching this data, and based on other factors related to system operations and the IMDG cache itself (e.g., available memory, cost to fetch the item (such as for a read-through cache), etc.).

The weight/vote provided by the client application may influence the analytical score and the decision regarding whether to cache the requested data. It should be noted that it may consume time and processor utilization to calculate a score and make a decision regarding whether to cache the requested data. As such, these evaluations may not be performed on every data request. To improve efficiency, these evaluations may be performed routinely (e.g., scheduled periodically, scheduled aperiodically, event driven, or otherwise invoked as appropriate for a given implementation). Within such an implementation, the cache management system may store the requested data for a short time by initially setting a short time-to-live (TTL), and if the client scores it high, the cache management system may increase the TTL of the data item within the cache. Alternatively, if the client scores low, the cache management system may let the data expire at its current TTL or may decrease the TTL of the data item within the cache so that the data expires more quickly.

It should be noted that conception of the present subject matter resulted from recognition of certain limitations associated with in-memory data grid (IMDG) cache management. For example, it was observed that prior technologies for management of IMDG caching involved decisions driven by the back-end database itself related primarily to information derived by back-end processing of data requests. It was additionally determined that these prior technologies lacked awareness of front-end client-side constraints, which was further determined to result in non-optimized caching of data within an IMDG due to the limited informational processing associated with the back-end database. The technology described herein provides for client-based access awareness and client-based participation regarding evaluation of and decisions on IMDG cache management. The present subject matter augments and improves IMDG cache management and data accessibility within an IMDG by providing for client-based participation and evaluation regarding decisions that affect IMDG cache management, as described above and in more detail below. As such, improved IMDG cache management may be obtained through use of the present technology.

The client voting-inclusive in-memory data grid (IMDG) cache management described herein may be performed in real time to allow prompt determinations regarding cache management within an IMDG based upon client-aware analytics in combination with server-side performance-related analytics. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
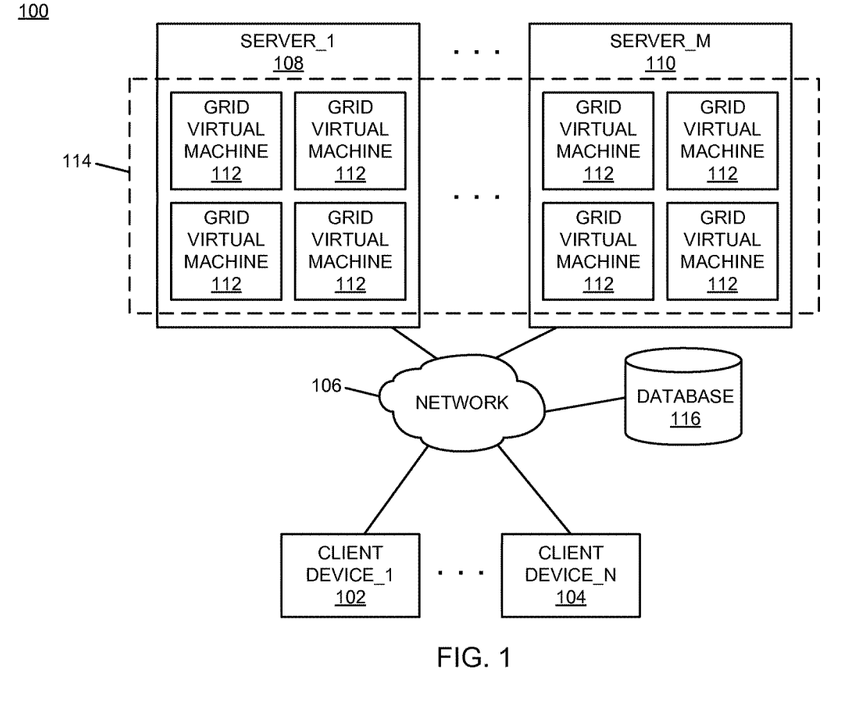
FIG. 1 is a block diagram of an example of an implementation of a system for client voting-inclusive in-memory data grid (IMDG) cache management according to an embodiment of the present subject matter.

FIG. 1 is a block diagram of an example of an implementation of a system 100 for client voting-inclusive in-memory data grid (IMDG) cache management. A client device_1 102 through a client device_N 104 communicate via a network 106 with several other devices. The other devices include a server_1 108 through a server_M 110. The server_1 108 through the server_M 110 may each host one or more virtual machine instances 112 that collectively form an IMDG 114, including cache memory for use in association with the IMDG 114. The client device_1 102 through the client device_N 104 may each host one or more client applications that utilize data services provided by the IMDG 114.

One or more of the server_1 108 through the server_M 110 may also independently or collectively host a cache management service (not separately illustrated) that performs the analytics described above and in more detail below regarding caching of data in association with the IMDG 114. The one or more of the server_1 108 through the server_M 110 that operate to host the IMDG 114 also have access to a database 116. The database 116 operates as back-end, longer-term, storage within the system 100 for use by the client applications that are provided services by the IMDG 114.

As will be described in more detail below in association with FIG. 2 through FIG. 4, the server_1 108 through the server_M 110 may each provide automated client voting-inclusive in-memory data grid (IMDG) cache management, though if appropriate for a given implementation the technology described herein may also be implemented at a client device that hosts multiple virtual machines and applications as technologies develop over time. The automated client voting-inclusive in-memory data grid (IMDG) cache management is based upon analysis of client access patterns (e.g., types of data accesses, access frequency, and other patterns) in conjunction with client voting/weighting that are collectively factored into determinations of whether to cache data in association with the IMDG for quicker future access. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of hosting virtual machine instances and providing data for consumption by a device, such as the client device_1 102 through the client device_N 104, via a network, such as the network 106. As such, the server_1 108 through the server_M 110 may each include a web server, application server, or other data server device that additionally hosts one or more virtual machine instances that form a portion of an IMDG.

The database 116 may include a relational database, an object database, or any other storage type of device. As such, the database 116 may be implemented as appropriate for a given implementation.

Figure 2:
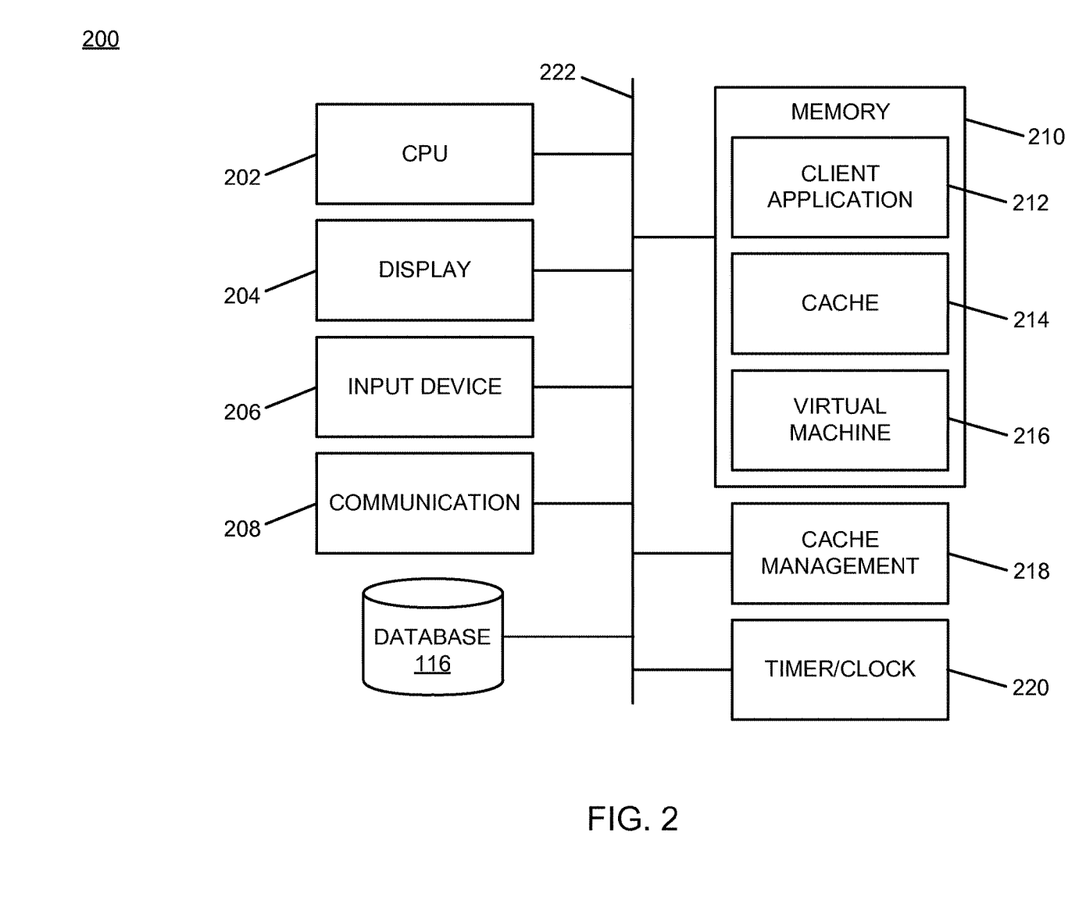
FIG. 2 is a block diagram of an example of an implementation of a core processing module capable of performing client voting-inclusive in-memory data grid (IMDG) cache management according to an embodiment of the present subject matter.

FIG. 2 is a block diagram of an example of an implementation of a core processing module 200 capable of performing client voting-inclusive in-memory data grid (IMDG) cache management. Certain of the elements described in association with the core processing module 200 may be associated with either the client device_1 102 through the client device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of data access requests in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a client application area 212 that provides storage and execution space for one or more client applications where the core processing module 200 is implemented in association with any of the client device_1 102 through the client device_N 104. The client applications may utilize an IMDG hosted by one or more of the server_1 108 through the server_M 110.

Alternatively, where the core processing module 200 is implemented in association with one or more of the server_1 108 through the server_M 110, the memory 210 includes a cache memory area 214 and a virtual machine area 216. The virtual machine area 216 provides storage and execution space for one or more virtual machines where the core processing module 200 is implemented in association with any of the server_1 108 through the server_M 110. The cache memory area 214 provides cache storage, either centralized or distributed across multiple servers, for an IMDG provided by one or more virtual machine instances (that may again also be centralized on one server or distributed across multiple servers).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A cache management module 218 is also illustrated, and may be implemented in any device that provides at least a portion of an IMDG. The cache management module 218 provides the cache management service, including analytics and cache management processing for the core processing module 200, as described above and in more detail below. The cache management module 218 implements the automated client voting-inclusive in-memory data grid (IMDG) cache management of the core processing module 200. The cache management module 218 may be centralized on one server. Alternatively, the cache management module 218 may be a distributed collaborative cache management module that operates across multiple servers.

It should also be noted that the cache management module 218 may form a portion of other circuitry described without departure from the scope of the present subject matter. Further, the cache management module 218 may alternatively be implemented as an application stored within the memory 210. The cache management module 218 may form a portion of an interrupt service routine (ISR), a portion of an operating system, or a portion of an application without departure from the scope of the present subject matter. The cache management module 218 may also include an embedded device with circuitry designed specifically to perform the processing described herein as appropriate for a given implementation.

A timer/clock module 220 is illustrated and used to determine timing and date information, such as time to live (TTL) for cached data and other timing uses, as described above and in more detail below. As such, the cache management module 218 may utilize information derived from the timer/clock module 220 for information processing activities, such as the client voting-inclusive in-memory data grid (IMDG) cache management described herein.

The database 116 is again shown within FIG. 2 associated with the core processing module 200 for implementation of the core processing module at devices that provide back-end storage access for use by client applications and caching in association with an IMDG. As such, the database 116 may be operatively coupled to the core processing module 200 without use of network connectivity, as appropriate for a given implementation.

The CPU 202, the display 204, the input device 206, the communication module 208, the memory 210, the cache management module 218, the timer/clock module 220, and the database 116 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. It should also be understood that, though the database 116 is illustrated as a separate component for purposes of example, the information stored within the database 116 may also/alternatively be stored within the memory 210 without departure from the scope of the present subject matter. Accordingly, the core processing module 200 may take many forms and may be associated with many platforms.

Figure 3:
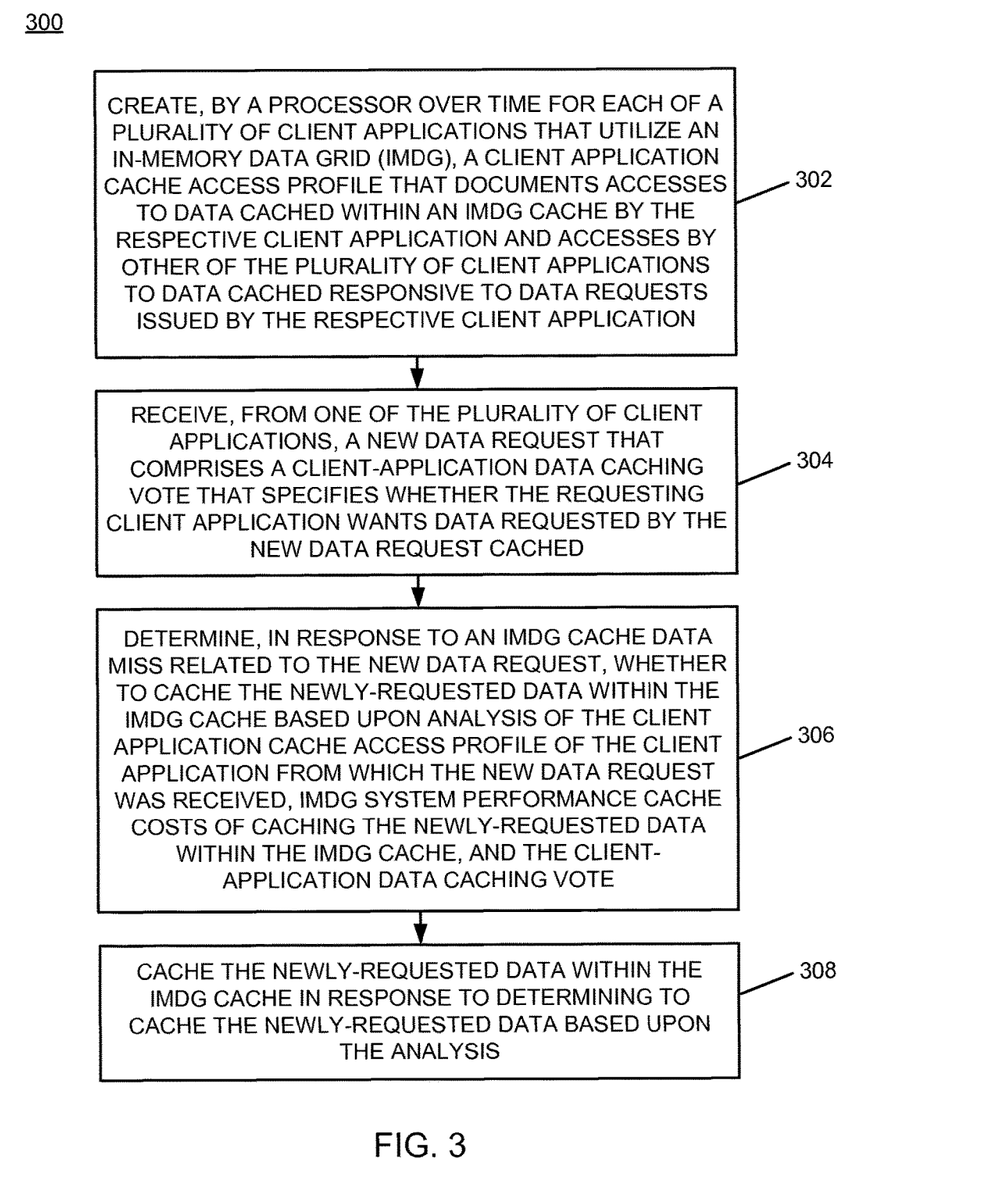
FIG. 3 is a flow chart of an example of an implementation of a process for client voting-inclusive in-memory data grid (IMDG) cache management according to an embodiment of the present subject matter.
Figure 4:
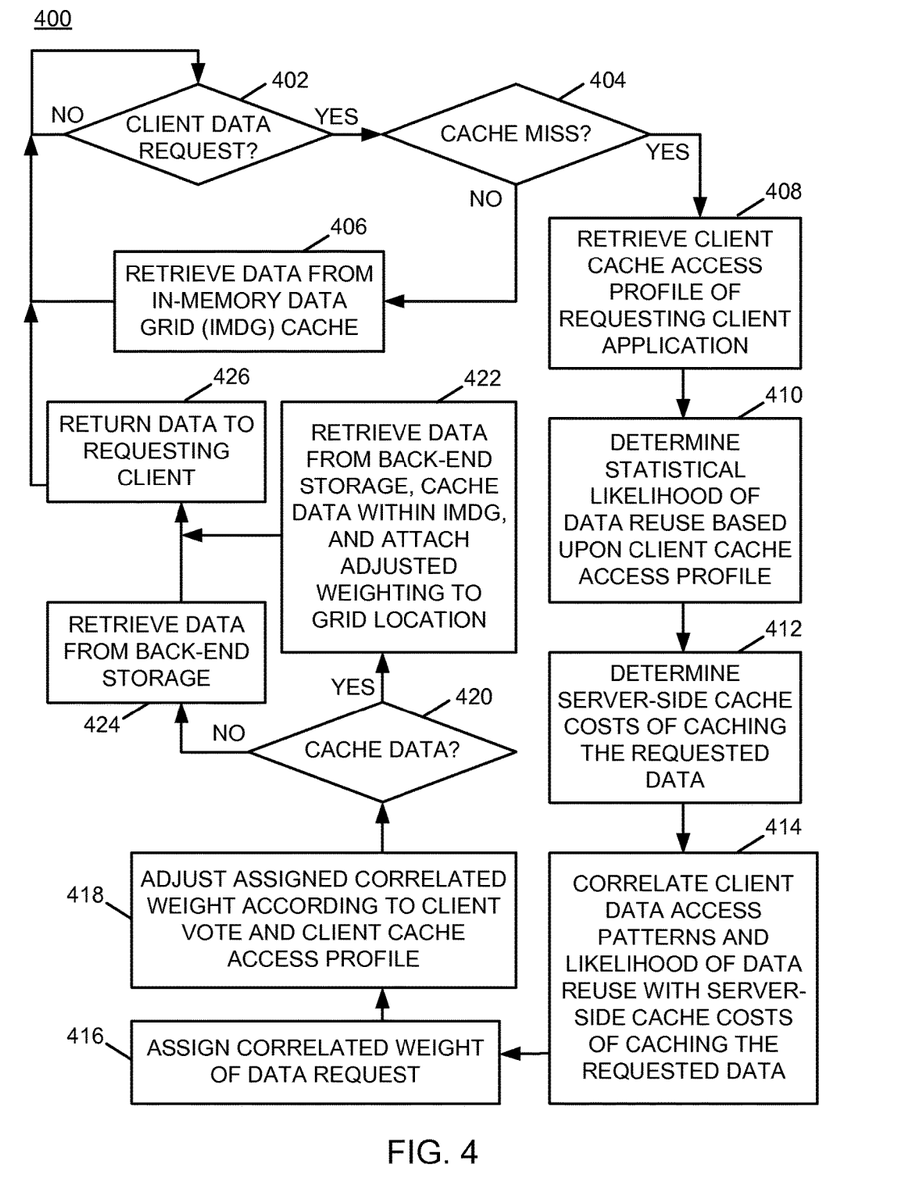
FIG. 4 is a flow chart of an example of an implementation of a process for client voting-inclusive in-memory data grid (IMDG) cache management that operates to correlate client data access patterns with a likelihood of data reuse, server-side IMDG system performance cache costs, and a client vote regarding caching of requested data according to an embodiment of the present subject matter.

FIG. 3 through FIG. 4 described below represent example processes that may be executed by devices, such as the core processing module 200, to perform the automated client voting-inclusive in-memory data grid (IMDG) cache management associated with the present subject matter. Many other variations on the example processes are possible and all are considered within the scope of the present subject matter. The example processes may be performed by modules, such as the cache management module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for client voting-inclusive in-memory data grid (IMDG) cache management. The process 300 represents a processor-implemented method of performing the client-aware cache management described herein. At block 302, the process 300 creates, by a processor over time for each of a plurality of client applications that utilize an in-memory data grid (IMDG), a client application cache access profile that documents accesses to data cached within an IMDG cache by the respective client application and accesses by other of the plurality of client applications to data cached responsive to data requests issued by the respective client application. At block 304, the process 300 receives, from one of the plurality of client applications, a new data request that comprises a client-application data caching vote that specifies whether the requesting client application wants data requested by the new data request cached. At block 306, the process 300 determines, in response to an IMDG cache data miss related to the new data request, whether to cache the newly-requested data within the IMDG cache based upon analysis of the client application cache access profile of the client application from which the new data request was received, IMDG system performance cache costs of caching the newly-requested data within the IMDG cache, and the client-application data caching vote. At block 308, the process 300 caches the newly-requested data within the IMDG cache in response to determining to cache the newly-requested data based upon the analysis.

FIG. 4 is a flow chart of an example of an implementation of a process 400 for client voting-inclusive in-memory data grid (IMDG) cache management that operates to correlate client data access patterns with a likelihood of data reuse, server-side IMDG system performance cache costs, and a client vote regarding caching of requested data. The process 400 represents a processor-implemented method of performing the client-aware cache management described herein. At decision point 402, the process 400 makes a determination as to whether a client data request has been detected. The client data request may include a vote from the client that specifies whether the requesting client application wants data requested by the new data request cached if the data is not already stored in the IMDG cache. In response to determining that a client data request has been detected, the process 400 makes a determination at decision point 404 as to whether a cache miss with respect to an IMDG cache occurred for the requested data associated with the data request.

In response to determining that a cache miss with respect to the IMDG cache did not occur for the requested data associated with the data request, the process 400 retrieves the requested data from the IMDG cache at block 406. The process 400 returns to decision point 402 and iterates as described above.

Alternatively, in response to determining at decision point 404 that a cache miss with respect to the IMDG cache did occur for the requested data associated with the data request, the process 400 retrieves a client application cache access profile of the requesting client application at block 408. As described above, client applications that make a data request within an IMDG may be evaluated over time to determine whether the client applications are requesting data that has additional value for reuse (e.g., by the requesting application or by other applications), or whether the respective client application routinely makes "one-off" data requests where the costs of caching the data (e.g., fetching, etc.) are greater than the resulting benefits. This and other forms of information may be accumulated over time within a client application cache access profile for client applications that access the IMDG.

As such, the retrieved client application cache access profile may include analytics related to reuse, by the respective client application associated with the client application cache access profile, of data cached responsive to the data requests issued by the respective client application over time. The client application cache access profile may also include analytics related to reuse, by other client applications, of data cached responsive to data requests issued by the respective client application over time. The client application cache access profile may further include analytics related to a proportion of data requests by the respective client application associated with the respective client application cache access profile that have been determined to result in IMDG cache costs greater than a threshold data reuse benefit. The client application cache access profile may include client application data access patterns (e.g., frequency of reuse by the same application, frequency of types of data requests, etc.) related to the data cached responsive to data requests issued by the respective client application. It should be noted that the client application cache access profile may include additional analytics and measures associated with and as appropriate for a given implementation.

At block 410, the process 400 determines a statistical likelihood of data reuse of the requested data based upon the client application cache access profile of the requesting client application (e.g., reusable data versus "one-off" data requests). At block 412, the process 400 determines a server-side IMDG cache cost (or a set of costs) of caching the requested data. At block 414, the process 400 correlates the client application data access patterns and likelihood of data reuse associated with the requesting client application with the server-side IMDG cache costs of caching the requested data. At block 416, the process 400 assigns a correlated weight of the new data request.

At block 418, the process 400 adjusts the assigned correlated weight of the new data request according to the client-application data caching vote and the client application cache access profile of the requesting client application. For example, where the client application votes to cache the requested data, but routinely requests data that is not used or accessed again or that is not reused by other client applications, the assigned correlated weight of the new data request may be decreased. Alternatively, even if a client application does not vote to cache the requested data, but the data requested by the client application is determined to be routinely reused by that client application and/or other client applications, the assigned correlated weight of the new data request may be increased. As an additional alternative, where the client application votes to cache the requested data, and routinely requests data that is used again or that is routinely reused by other client applications, the assigned correlated weight of the new data request may be increased significantly. The attached weightings in a data map of the IMDG cache may be adjusted to reflect the high value of maintaining the data within the IMDG cache rather than replacing the data with less reusable data. Many other possibilities exist for adjusting the assigned correlated weight of the new data request, and all such forms of adjustment are considered to be within the scope of the present description.

In response to adjusting the assigned correlated weight of the new data request according to the client-application data caching vote and the client application cache access profile of the requesting client application at block 418, the process 400 makes a determination as to whether to cache the requested data at decision point 420. The determination with respect to whether to cache the requested data may be made by applying a cache data replacement policy based upon a cache data replacement threshold weighting difference to the adjusted assigned correlated weight of the new data request, and determining from the applied policy and the adjusted assigned correlated weight of the new data request whether to replace a current entry in the IMDG cache with the requested data. The cache data replacement threshold weighting difference may specify a differential value between cache data map values of data that is currently cached in the IMDG cache (e.g., within a cache data map) and the adjusted assigned correlated weight of the new data request. For example, where data that is currently stored at a particular location within the IMDG cache has weighting of eight tenths (e.g., 0.8 or 80%), a threshold difference of ten percent (10%) or other measure higher than currently-stored data may be specified to avoid incurring the costs of caching the data where a margin of benefit is relatively narrow relative to data already stored in the IMDG cache.

In response to determining to cache the data requested by the new data request, with consideration of applied policies, the adjusted weighting of the client vote, and the client application's client application cache access profile, at block 422 the process 400 retrieves the data from back-end storage, caches the data within the IMDG cache, and attaches the adjusted assigned correlated weight of the requested data to the data map of the IMDG cache at a cache storage location referenced within the data map where the data is cached. Alternatively, in response to determining not to cache the data requested by the new data request, with consideration of the adjusted weighting of the client vote and the client application's client application cache access profile, at block 424 the process 400 retrieves the data from back-end storage.

In response to either caching the data at block 422 or in response to retrieving the data from back-end storage (without caching the data) at block 424, the process 400 returns the requested data to the requesting client application at block 426. The process 400 returns to decision point 402 and iterates as described above.

As such, the process 400 manages client application data requests by performing analysis on the individual requests relative to the client application data access patterns of the requesting client application and relative to data access patterns of other client applications that are associated with data requests by the requesting client application. The process 400 correlates this client-centric information with back-end caching costs related to the IMDG, and assigns a weighting value to the requested data. The assigned weighting value is then adjusted according to the client application vote (e.g., the perspective of the requesting application itself regarding the value of caching the requested data). The process 400 applies one or more policies regarding data retention and replacement within the IMDG cache to determine whether to replace a current entry in the IMDG cache with the requested data. The process 400 updates a data map of the IMDG cache with the adjusted weighting value of cached data to further improve IMDG caching decisions and IMDG cache management.

As described above in association with FIG. 1 through FIG. 4, the example systems and processes provide client voting-inclusive in-memory data grid (IMDG) cache management. Many other variations and additional activities associated with client voting-inclusive in-memory data grid (IMDG) cache management are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    creating, by a processor over time for each of a plurality of client applications that utilize an in-memory data grid (IMDG), a client application cache access profile that documents accesses to data cached within an IMDG cache by the respective client application and accesses by other of the plurality of client applications to data cached responsive to data requests issued by the respective client application;
    receiving, from one of the plurality of client applications, a new data request that comprises a client-application data caching vote that specifies whether the requesting client application wants data requested by the new data request cached;
    determining, in response to an IMDG cache data miss related to the new data request, whether to cache the newly-requested data within the IMDG cache based upon analysis of the client application cache access profile of the client application from which the new data request was received, IMDG system performance cache costs of caching the newly-requested data within the IMDG cache, and the client-application data caching vote; and
    caching the newly-requested data within the IMDG cache in response to determining to cache the newly-requested data based upon the analysis.

2. The method of claim 1, where each respective client application cache access profile further comprises:
    analytics related to reuse, by the respective client application for which the respective client application cache access profile was created, of the data cached responsive to the data requests issued by the respective client application; and
    analytics related to reuse, by the other of the plurality of client applications, of the data cached responsive to the data requests issued by the respective client application.

3. The method of claim 1, where each respective client application cache access profile further comprises:
    analytics related to a proportion of data requests by the respective client application, for which the respective client application cache access profile was created, determined to result in IMDG cache costs greater than a threshold data reuse benefit.

4. The method of claim 1, where each respective client application cache access profile further comprises client application data access patterns related to the data cached responsive to the data requests issued by the respective client application.

5. The method of claim 1, where determining, in response to the IMDG cache data miss related to the new data request, whether to cache the newly-requested data within the IMDG cache based upon the analysis of the client application cache access profile of the client application from which the new date request was received, the IMDG system performance cache costs of caching the newly-requested data within the IMDG cache, and the client-application data caching vote comprises:
    determining a statistical likelihood of data reuse by the respective client application and by the other of the plurality of client applications of the newly-requested data based upon the client application cache access profile of the respective client application;
    determining a server-side IMDG system performance cache cost of caching the newly-requested data;
    correlating client application data access patterns of the respective client application with the statistical likelihood of data reuse and the server-side IMDG system performance cache cost of caching the newly-requested data; and
    determining an assigned correlated weight of the new data request.

6. The method of claim 5, further comprising:
    adjusting the assigned correlated weight of the new data request according to the client-application data caching vote and the client application cache access profile of the respective client application.

7. The method of claim 6, further comprising:
    applying a policy based upon a cache data replacement threshold weighting difference to the adjusted assigned correlated weight of the new data request;
    determining from the applied policy and the adjusted assigned correlated weight of the new data request whether to replace a current entry in the IMDG cache with the newly-requested data; and
    in response to replacing the current entry in the IMDG cache with the newly-requested data:
        caching the newly-requested data within the IMDG cache; and
        attaching the adjusted assigned correlated weight of the new data request to a data map of the IMDG cache at a cache storage location referenced within a data map where the newly-requested data is cached.

8. A system, comprising:
an in-memory data grid (IMDG) cache; and
a processor programmed to:
  create, over time for each of a plurality of client applications that utilize an IMDG, a client application cache access profile that documents accesses to data cached within the IMDG cache by the respective client application and accesses by other of the plurality of client applications to data cached responsive to data requests issued by the respective client application;
  receive, from one of the plurality of client applications, a new data request that comprises a client-application data caching vote that specifies whether the requesting client application wants data requested by the new data request cached;
  determine, in response to an IMDG cache data miss related to the new data request, whether to cache the newly-requested data within the IMDG cache based upon analysis of the client application cache access profile of the client application from which the new data request was received, IMDG system performance cache costs of caching the newly-requested data within the IMDG cache, and the client-application data caching vote; and
  cache the newly-requested data within the IMDG cache in response to determining to cache the newly-requested data based upon the analysis.

9. The system of claim 8, where each respective client application cache access profile further comprises:
  analytics related to reuse, by the respective client application for which the respective client application cache access profile was created, of the data cached responsive to the data requests issued by the respective client application; and
  analytics related to reuse, by the other of the plurality of client applications, of the data cached responsive to the data requests issued by the respective client application.

10. The system of claim 8, where each respective client application cache access profile further comprises:
  analytics related to a proportion of data requests by the respective client application, for which the respective client application cache access profile was created, determined to result in IMDG cache costs greater than a threshold data reuse benefit.

11. The system of claim 8, where each respective client application cache access profile further comprises client application data access patterns related to the data cached responsive to the data requests issued by the respective client application.

12. The system of claim 8, where, in being programmed to determine, in response to the IMDG cache data miss related to the new data request, whether to cache the newly-requested data within the IMDG cache based upon the analysis of the client application cache access profile of the client application from which the new date request was received, the IMDG system performance cache costs of caching the newly-requested data within the IMDG cache, and the client-application data caching vote, the processor is programmed to:
  determine a statistical likelihood of data reuse by the respective client application and by the other of the plurality of client applications of the newly-requested data based upon the client application cache access profile of the respective client application;
  determine a server-side IMDG system performance cache cost of caching the newly-requested data;
  correlate client application data access patterns of the respective client application with the statistical likelihood of data reuse and the server-side IMDG system performance cache cost of caching the newly-requested data; and
  determine an assigned correlated weight of the new data request; and
the processor is further programmed to:
  adjust the assigned correlated weight of the new data request according to the client-application data caching vote and the client application cache access profile of the respective client application.

13. The system of claim 12, where the processor is further programmed to:
  apply a policy based upon a cache data replacement threshold weighting difference to the adjusted assigned correlated weight of the new data request;
  determine from the applied policy and the adjusted assigned correlated weight of the new data request whether to replace a current entry in the IMDG cache with the newly-requested data; and
  in response to replacing the current entry in the IMDG cache with the newly-requested data:
    cache the newly-requested data within the IMDG cache; and
    attach the adjusted assigned correlated weight of the new data request to a data map of the IMDG cache at a cache storage location referenced within a data map where the newly-requested data is cached.

14. A computer program product, comprising:
a computer readable storage medium having computer readable program code embodied therewith, where the computer readable storage medium is not a transitory signal per se and where the computer readable program code when executed on a computer causes the computer to:
  create, over time for each of a plurality of client applications that utilize an in-memory data grid (IMDG), a client application cache access profile that documents accesses to data cached within an IMDG cache by the respective client application and accesses by other of the plurality of client applications to data cached responsive to data requests issued by the respective client application;
  receive, from one of the plurality of client applications, a new data request that comprises a client-application data caching vote that specifies whether the requesting client application wants data requested by the new data request cached;
  determine, in response to an IMDG cache data miss related to the new data request, whether to cache the newly-requested data within the IMDG cache based upon analysis of the client application cache access profile of the client application from which the new data request was received, IMDG system performance cache costs of caching the newly-requested data within the IMDG cache, and the client-application data caching vote; and
  cache the newly-requested data within the IMDG cache in response to determining to cache the newly-requested data based upon the analysis.

15. The computer program product of claim 14, where each respective client application cache access profile further comprises:

analytics related to reuse, by the respective client application for which the respective client application cache access profile was created, of the data cached responsive to the data requests issued by the respective client application; and analytics related to reuse, by the other of the plurality of client applications, of the data cached responsive to the data requests issued by the respective client application.

16. The computer program product of claim 14, where each respective client application cache access profile further comprises:

analytics related to a proportion of data requests by the respective client application, for which the respective client application cache access profile was created, determined to result in IMDG cache costs greater than a threshold data reuse benefit.

17. The computer program product of claim 14, where each respective client application cache access profile further comprises client application data access patterns related to the data cached responsive to the data requests issued by the respective client application.

18. The computer program product of claim 14, where, in causing the computer to determine, in response to the IMDG cache data miss related to the new data request, whether to cache the newly-requested data within the IMDG cache based upon the analysis of the client application cache access profile of the client application from which the new date request was received, the IMDG system performance cache costs of caching the newly-requested data within the IMDG cache, and the client-application data caching vote, the computer readable program code when executed on the computer causes the computer to:

determine a statistical likelihood of data reuse by the respective client application and by the other of the plurality of client applications of the newly-requested data based upon the client application cache access profile of the respective client application;

determine a server-side IMDG system performance cache cost of caching the newly-requested data;

correlate client application data access patterns of the respective client application with the statistical likelihood of data reuse and the server-side IMDG system performance cache cost of caching the newly-requested data; and determine an assigned correlated weight of the new data request.

19. The computer program product of claim 18, where the computer readable program code when executed on the computer further causes the computer to:

adjust the assigned correlated weight of the new data request according to the client-application data caching vote and the client application cache access profile of the respective client application.

20. The computer program product of claim 19, the computer readable program code when executed on the computer further causes the computer to:

apply a policy based upon a cache data replacement threshold weighting difference to the adjusted assigned correlated weight of the new data request;

determine from the applied policy and the adjusted assigned correlated weight of the new data request whether to replace a current entry in the IMDG cache with the newly-requested data; and in response to replacing the current entry in the IMDG cache with the newly-requested data:
  cache the newly-requested data within the IMDG cache; and
  attach the adjusted assigned correlated weight of the new data request to a data map of the IMDG cache at a cache storage location referenced within a data map where the newly-requested data is cached.

* * * * *